United States Patent
Ishii et al.

(10) Patent No.: US 11,404,715 B2
(45) Date of Patent: Aug. 2, 2022

(54) ASSEMBLED BATTERY

(71) Applicant: TOYOTA JIDOSHA KABUSHIKI KAISHA, Toyota (JP)

(72) Inventors: Masaru Ishii, Miyoshi (JP); Masato Kamiya, Toyota (JP); Takayuki Hojo, Nagoya (JP); Tetsuya Kaneko, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 105 days.

(21) Appl. No.: 15/790,522

(22) Filed: Oct. 23, 2017

(65) Prior Publication Data
US 2018/0131032 A1    May 10, 2018

(30) Foreign Application Priority Data
Nov. 8, 2016  (JP) .............................. JP2016-217939

(51) Int. Cl.
*H01M 10/00* (2006.01)
*H01M 10/04* (2006.01)
(Continued)

(52) U.S. Cl.
CPC ... *H01M 10/0481* (2013.01); *H01M 10/0413* (2013.01); *H01M 10/0468* (2013.01);
(Continued)

(58) Field of Classification Search
CPC ........... H01M 10/0481; H01M 10/625; H01M 50/24; H01M 50/50; H01M 50/502;
(Continued)

(56) References Cited

U.S. PATENT DOCUMENTS

| 6,033,800 A * | 3/2000 | Ichiyanagi .......... H01M 2/0207 429/120 |
| 2006/0096797 A1* | 5/2006 | Tsuchiya ................. B60R 16/04 180/68.5 |

(Continued)

FOREIGN PATENT DOCUMENTS

| JP | S52155330 A * 12/1977 |
| JP | 2009-43570 A    2/2009 |

(Continued)

OTHER PUBLICATIONS

Translation of JP-2012151581-A, Aug. 2012, JP, Yanh Chi Ye (Year: 2012).*

(Continued)

*Primary Examiner* — Milton I Cano
*Assistant Examiner* — Mary G Henshaw
(74) *Attorney, Agent, or Firm* — Sughrue Mion, PLLC (57) ABSTRACT

An assembled battery disclosed here includes a plurality of single cell array units each including single cells that are arranged in a lamination direction of a positive electrode and a negative electrode of an electrode body as an arrangement direction. The single cell array units are disposed parallel to each other such that arrangement directions of the single cells constituting the units are parallel to each other. Then, in the assembled battery, none of the single cells included in each of the single cell array units is directly electrically connected to adjacent single cells in the same unit, but is directly electrically connected to any one of the single cells constituting another single cell array unit through a bus bar.

2 Claims, 7 Drawing Sheets

(51) Int. Cl.
  *H01M 50/20* (2021.01)
  *H01M 50/24* (2021.01)
  *H01M 50/50* (2021.01)
  *H01M 50/502* (2021.01)
  *H01M 10/625* (2014.01)
  *H01M 10/0525* (2010.01)
  *H01M 50/103* (2021.01)
  *H01M 50/557* (2021.01)

(52) U.S. Cl.
  CPC ..... *H01M 10/0525* (2013.01); *H01M 10/625* (2015.04); *H01M 50/20* (2021.01); *H01M 50/24* (2021.01); *H01M 50/50* (2021.01); *H01M 50/502* (2021.01); *H01M 50/103* (2021.01); *H01M 50/557* (2021.01); *H01M 2220/20* (2013.01)

(58) Field of Classification Search
  CPC ............. H01M 50/20; H01M 10/0413; H01M 10/0468; H01M 10/0525; H01M 50/103; H01M 50/557; H01M 2200/20
  See application file for complete search history.

(56) References Cited

U.S. PATENT DOCUMENTS

| | | | |
|---|---|---|---|
| 2013/0157098 A1* | 6/2013 | McLaughlin | H01M 2/1077 429/120 |
| 2013/0273398 A1 | 10/2013 | Hoshi et al. | |
| 2016/0293925 A1* | 10/2016 | Nakayama | H01M 2/34 |

FOREIGN PATENT DOCUMENTS

| | | | |
|---|---|---|---|
| JP | 2012151581 A | * | 8/2012 |
| JP | 2013-235827 A | | 11/2013 |
| JP | 2015-002113 A | | 1/2015 |

OTHER PUBLICATIONS

Translation of JP-S52155330-A, Dec. 1977, JP, Washida, Toshiaki (Year: 1977).*
Human translation of Washida (JPS52155330) (Year: 1977).*

* cited by examiner

ASSEMBLED BATTERY

INCORPORATION BY REFERENCE

The disclosure of Japanese Patent Application No. 2016-217939 filed on Nov. 8, 2016 including the specification, drawings and abstract is incorporated herein by reference in its entirety.

BACKGROUND

1. Technical Field

The present disclosure relates to an assembled battery, and specifically, to an assembled battery in which a secondary battery is used as a single cell, and the assembled batteries each includes a plurality of these single cells.

2. Description of Related Art

Assembled batteries in which a lithium ion secondary battery, a nickel metal hydride battery, another secondary battery, or a power storage element such as a capacitor is used as a single cell, and the assembled batteries each includes a plurality of these single cells are increasingly important as power supplies mounted in vehicles or power supplies of computers or mobile terminals. In particular, an assembled battery in which a lightweight lithium ion secondary battery with a high energy density is used as a single cell is preferably used for a high output power supply mounted in vehicles and the like.

Figure 9:
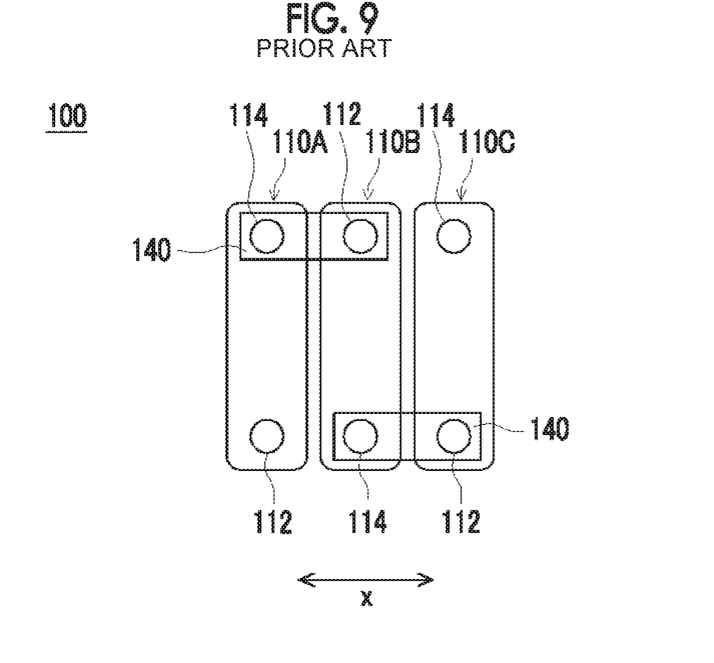
FIG. 9 is a plan view schematically showing an assembled battery of the related art.

An example of such an assembled battery is shown in FIG. 9. An assembled battery 100 includes a plurality of flat rectangular single cells 110A to 110C. The single cells 110A to 110C are arranged such that wide surfaces (flat surfaces) are adjacent to each other in an arrangement direction x. Here, in the assembled battery 100, a positive electrode terminal 112 and a negative electrode terminal 114 are electrically sequentially connected by a bus bar 140 between the single cells 110A to 110C.

Incidentally, not only excellent battery performance but also a high level of safety are necessary for an assembled battery in which such a secondary battery is included as a component (a single cell). Therefore, various technologies for improving the safety of an assembled battery have been proposed. For example, in Japanese Patent Application Publication No. 2015-2113 (JP 2015-2113 A), a technology in which, when an external force is applied to a power storage module (assembled battery), short circuiting is reliably generated between power storage devices (single cells) and a rapid temperature rise is prevented is disclosed.

SUMMARY

Figure 10:
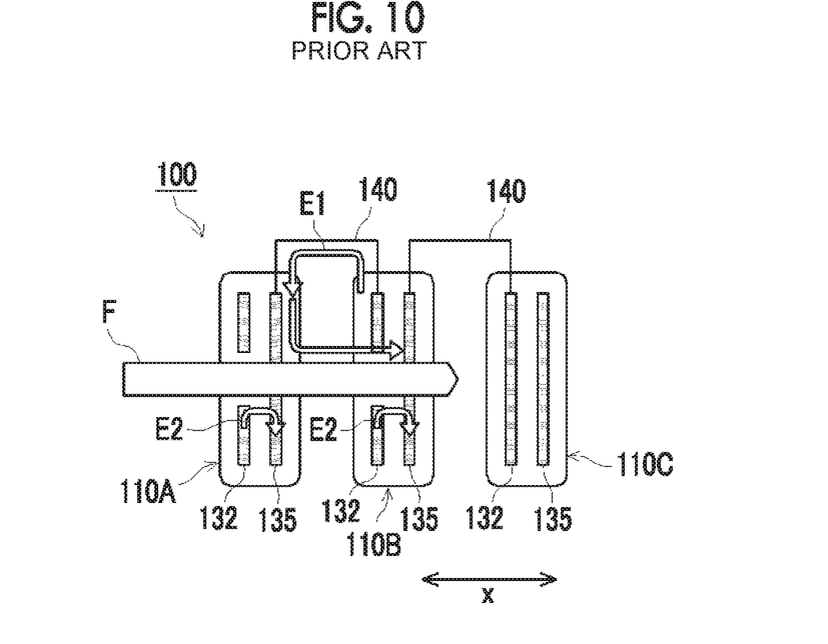
FIG. 10 is an explanatory diagram schematically showing a state in which a conductive foreign body is stuck into an assembled battery of the related art.

However, when an assembled battery that is mounted in a moving body such as a vehicle is used, as shown in FIG. 10, if a sharp conductive foreign body F such as a nail penetrates through a plurality of single cells constituting an assembled battery 100 so that a positive electrode 132 and a negative electrode 135 of each of single cells are penetrated in a lamination direction of the positive electrode and the negative electrode, there is a possibility of a short circuit current being generated in each of single cells 110A to 110C that have been penetrated and the temperature of the single cells 110A to 110C sharply increasing due to Joule heat of the short circuit current. In this case, the temperature rise occurring in the $1^{st}$ single cell 110A disposed on the furthest upstream side is almost the same as the temperature rise when a conductive foreign body is stuck into a single secondary battery. However, a more rapid temperature rise may occur in the single cells 110B and 110C that are disposed at the $2^{nd}$ and subsequent positions than in the $1^{st}$ single cell 110A.

For example, when the conductive foreign body F penetrates through the single cells 110A to 110C in a lamination direction of the positive electrode and the negative electrode, external short circuiting in which a short circuit current E1 flows between the plurality of single cells 110A and 110B through a bus bar 140 and the conductive foreign body F is formed. In this case, since two short circuit currents (about 700 A in total) including a short circuit current E2 generated inside the $2^{nd}$ single cell 110B and the short circuit current E1 of the above external short circuiting flow in the negative electrode 135 of the $2^{nd}$ single cell 110B, a rapid temperature rise may occur in the $2^{nd}$ single cell 110B. Thus, in an assembled battery in which two or more single cells are included, a rapid temperature rise may occur due to external short circuiting in single cells (for example, the single cell 110C in FIG. 10) that are disposed at the $2^{nd}$ and subsequent positions.

The present disclosure provides an assembled battery in which, when a sharp conductive foreign body is stuck into an assembled battery in which single cells are connected, it is possible to suitably prevent external short circuiting generated between a plurality of single cells and prevent a rapid temperature rise of a single cell due to a short circuit current.

According to the present disclosure, an assembled battery having the following configuration is provided.

The assembled battery disclosed here is an assembled battery including a plurality of single cells having the same shape, each of the single cells being a rectangular battery including an electrode body and a rectangular battery case accommodating the electrode body, the electrode body having a structure in which a positive electrode and a negative electrode are laminated. The assembled battery includes a plurality of single cell array units each including the single cells that are arranged adjacent to each other in a lamination direction of the positive electrode and the negative electrode in the electrode body as an arrangement direction. The single cell array units are disposed parallel to each other such that arrangement directions of the single cells constituting the units are substantially parallel to each other. Thus, in the assembled battery disclosed here, none of the single cells included in each of the single cell array units is directly electrically connected to adjacent single cells in the same single cell array unit, but is directly electrically connected to any one of the single cells constituting another single cell array unit through a bus bar.

In the assembled battery disclosed here, a plurality of single cell array units each including single cells that are arranged are included, and the plurality of single cell array units are disposed substantially parallel to each other. When a sharp conductive foreign body such as a nail is stuck into the assembled battery having the above structure, the conductive foreign body is stuck into one single cell array unit among the single cell array units that are disposed substantially parallel to each other and penetrates through the single cells constituting the one single cell array unit. Therefore, in the assembled battery disclosed here, since there is no direct electrical connection between adjacent single cells in the same single cell array unit, even when a conductive foreign body is stuck into and penetrates through one single cell array unit among the plurality of single cell array units constituting the assembled battery, no external short circuiting is formed through the conductive foreign body and the bus bar. Therefore, it is possible to prevent a rapid temperature rise in the single cell due to a short circuit current.

In the assembled battery disclosed here, an electrical connection may be formed such that the bus bar extends in a direction different from the arrangement direction of the single cells.

In the assembled battery disclosed here, each of the single cell array units may be formed such that an orientation of the assembled battery may be adjusted such that the arrangement direction of the single cells and a travelling direction of a vehicle in which the assembled battery is mounted are the same direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

As an assembled battery according to an embodiment of the present disclosure, an assembled battery in which a lithium ion secondary battery is used as a single cell and the lithium ion secondary batteries are connected will be exemplified below. Note that, in the assembled battery disclosed here, a battery used as a single cell is not limited to a lithium ion secondary battery, and, for example, a nickel metal hydride battery including a laminated electrode body can be used.

In addition, members and portions having the same functions are denoted by the same reference numerals in the following drawings for description. Here, the sizes (a length, a width, a thickness, and the like) in the drawings do not reflect actual sizes. In addition, components other than those particularly mentioned in this specification that are necessary for implementation of the present disclosure (for example, a configuration and a method of preparing an electrolyte, general techniques related to production of a lithium ion secondary battery) can be recognized by those skilled in the art as design matters based on the related art in the field.

1. Configuration of Single Cell

Figure 1:
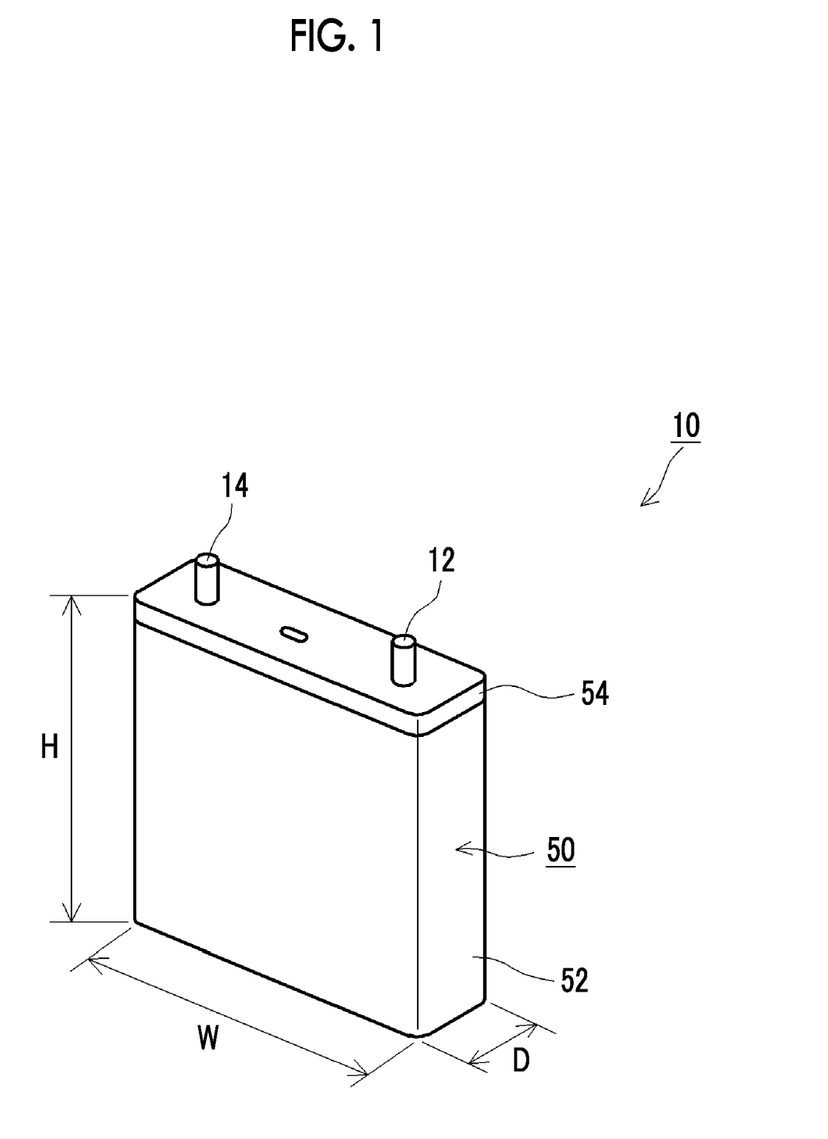
FIG. 1 is a perspective view schematically showing a single cell constituting an assembled battery according to an embodiment of the present disclosure.
Figure 2:
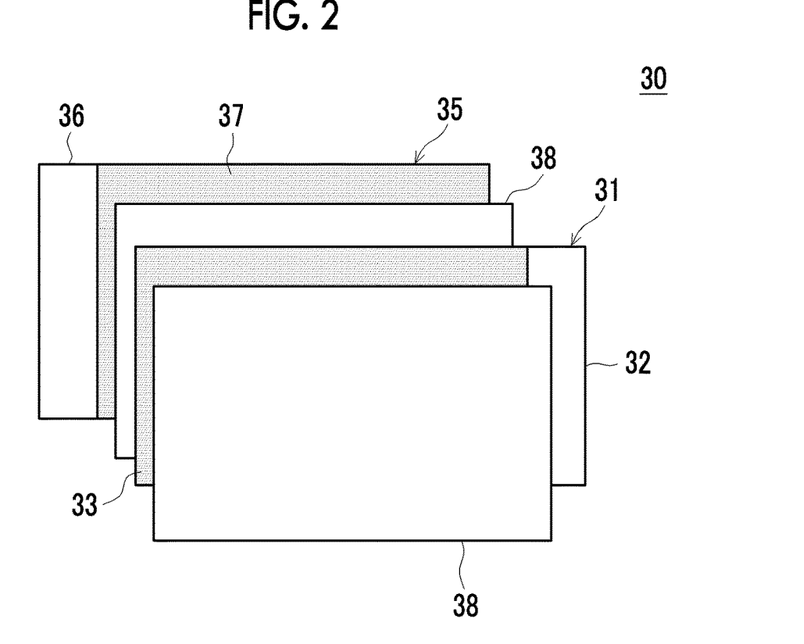
FIG. 2 is an explanatory diagram schematically showing members constituting an electrode body according to an embodiment of the present disclosure.
Figure 3:
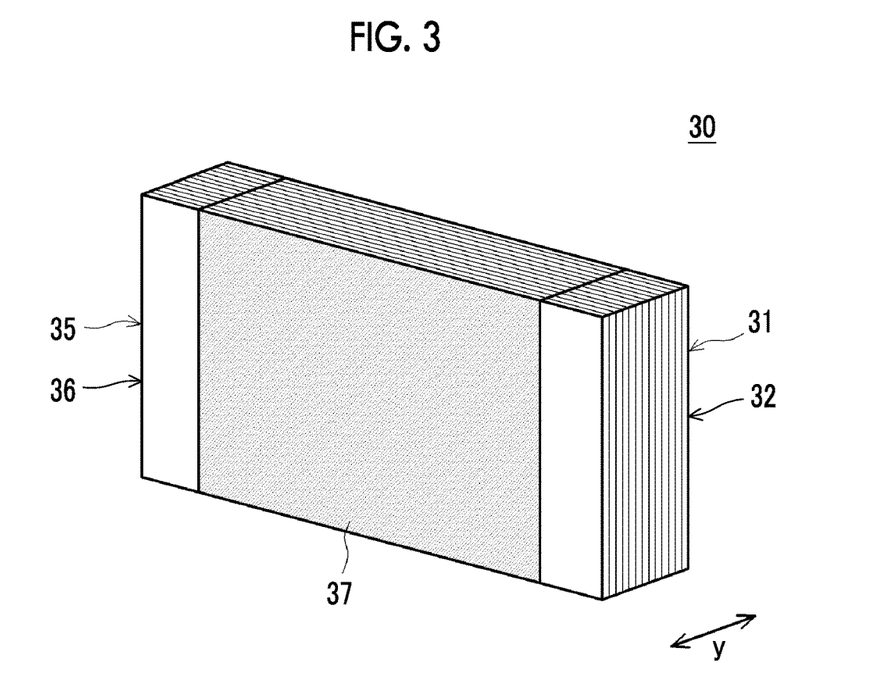
FIG. 3 is a perspective view schematically showing a configuration of an electrode body according to an embodiment of the present disclosure.

First, a single cell constituting an assembled battery according to the present embodiment will be described. FIG. 1 is a perspective view schematically showing a single cell constituting an assembled battery according to the present embodiment. FIG. 2 is an explanatory diagram schematically showing members constituting an electrode body in the present embodiment. FIG. 3 is a perspective view schematically showing a configuration of the electrode body in the present embodiment. A single cell 10 constituting the assembled battery according to the present embodiment is formed when an electrode body 30 shown in FIG. 2 and FIG. 3 is accommodated in a rectangular battery case 50 shown in FIG. 1.

(1) Battery Case

As shown in FIG. 1, the battery case 50 includes a flat rectangular case main body 52 whose upper surface is open and a lid 54 that closes an opening in the upper surface. The battery case 50 is preferably made of, for example, a metal or a resin. In addition, a positive electrode terminal 12 and a negative electrode terminal 14 are provided on the lid 54 forming the upper surface of the battery case 50. Although not shown, the positive electrode terminal 12 is connected to a positive electrode of an electrode body inside the battery case 50, and the negative electrode terminal 14 is connected to a negative electrode. Here, the positive electrode terminal 12 is preferably made of aluminum or an aluminum alloy. The negative electrode terminal 14 is preferably made of copper or a copper alloy.

(2) Electrolyte Solution

The electrode body 30 (refer to FIG. 3) and an electrolyte solution are accommodated together inside the above battery case 50. As the electrolyte solution, the same electrolyte solutions as used for the lithium ion secondary battery in the related art can be used without particular limitation. For example, a nonaqueous electrolyte solution in which lithium hexafluorophosphate (LiPF$_6$) is contained at a concentration of about 1 mol/L in a solvent mixture (for example, volume ratio 3:4:3) containing ethylene carbonate (EC), dimethyl carbonate (DMC), and ethyl methyl carbonate (EMC) can be used.

(3) Electrode Body

In the present embodiment, an electrode body having a structure in which a positive electrode and a negative electrode are laminated is used. Specifically, as shown in FIG. 2 and FIG. 3, the electrode body 30 in the present embodiment is a laminated electrode body formed by alternately laminating a plurality of rectangular sheet-like positive electrodes 31 and negative electrodes 35, and a separator 38 is disposed between the positive electrode 31 and the negative electrode 35. Here, an "electrode body having a structure in which positive electrodes and negative electrodes are laminated" in this specification is not limited to the above laminated electrode body formed by laminating the plurality of positive electrodes and negative electrodes. For example, as the electrode body, a wound electrode body produced by winding a long laminate in which long sheet-like positive electrodes and negative electrodes are laminated with separators therebetween in a longitudinal direction can be used.

In addition, as materials forming the electrode body 30, the same materials as used for a lithium ion secondary battery in the related art can be used without particular limitation. For example, the positive electrode 31 is formed by applying a positive electrode active material layer 33 to a surface of a positive electrode current collector 32 made of a rectangular aluminum foil or the like. The positive electrode active material layer 33 includes a positive electrode active material and other additives. In the positive electrode active material, a lithium-containing compound (lithium transition metal composite oxide) containing a lithium element and one or more types of transition metal element can be used. As the lithium transition metal composite oxide, a lithium nickel composite oxide (for example, $LiNiO_2$), a lithium cobalt composite oxide (for example, $LiCoO_2$), a lithium manganese composite oxide (for example, $LiMn_2O_4$), or a ternary lithium-containing composite oxide such as a lithium nickel cobalt manganese composite oxide (for example, $LiNi_{1/3}Co_{1/3}Mn_{1/3}O_2$) may be exemplified. Examples of the other additives include a conductive material, a binder, and the like. As the conductive material, for example, a carbon material such as carbon black and a carbon fiber may be exemplified. In addition, as the binder, for example, polyvinylidene fluoride (PVDF), polyvinylidene chloride (PVDC), polyethylene oxide (PEO), polytetrafluoroethylene (PTFE), carboxymethyl cellulose (CMC), and styrene butadiene rubber (SBR) may be exemplified.

On the other hand, the negative electrode 35 is formed by applying a negative electrode active material layer 37 containing a negative electrode active material to a surface of a negative electrode current collector 36 made of a rectangular copper foil or the like. The negative electrode active material layer 37 includes a negative electrode active material and other additives. As the negative electrode active material, for example, a carbon material such as graphite, non-graphitizable carbon (hard carbon), easily graphitizable carbon (soft carbon), carbon nanotubes, or a combination thereof can be used. In addition, as the other additives, a binder, a thickener, a dispersant, and the like can be appropriately used. For example, as the binder, the same binders as used in the above positive electrode active material layer can be used. As the thickener, carboxymethyl cellulose (CMC) or methyl cellulose (MC) can be used.

In addition, as the separator 38, a porous sheet (film) which is made of a resin and has a function of electrically insulating the positive electrode 31 and the negative electrode 35 and a function of holding a nonaqueous electrolyte is used. For the separator 38, for example, polyethylene (PE), polypropylene (PP), polyester, cellulose, or a polyamide can be used.

2. Configuration of Assembled Battery

Figure 4:
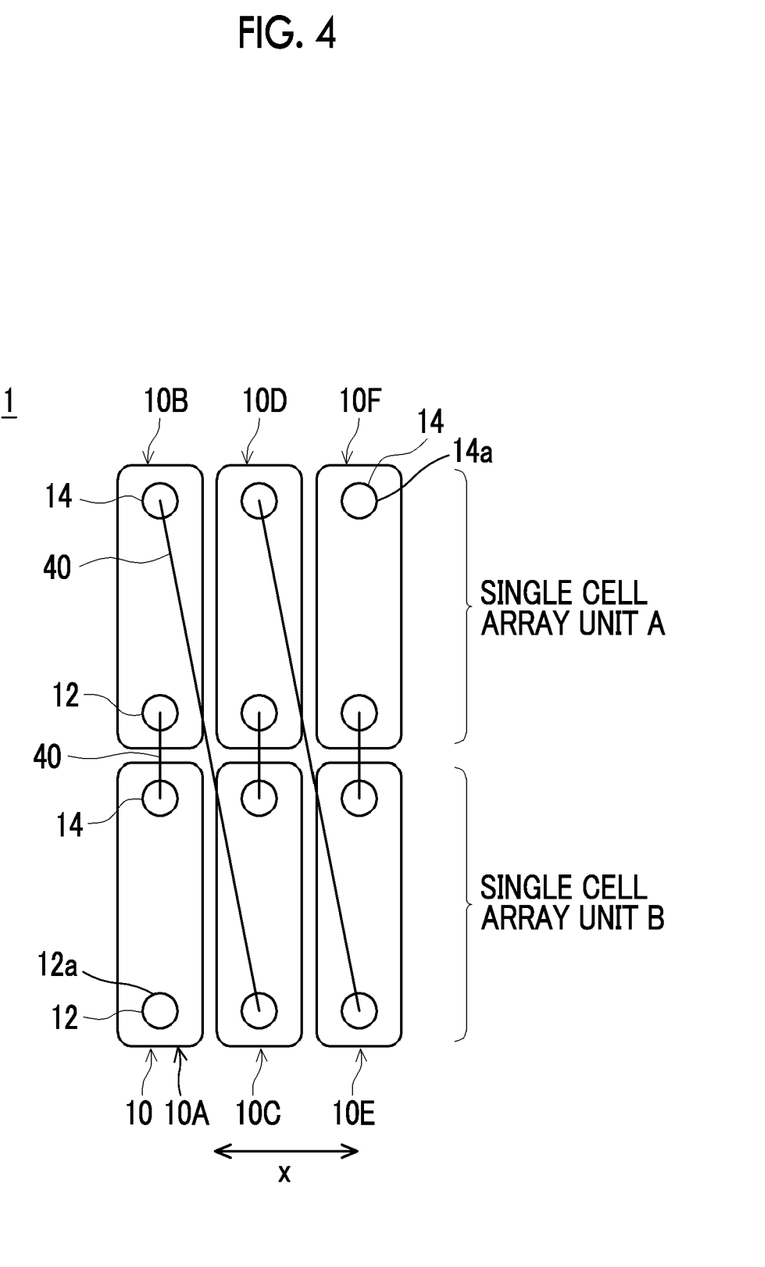
FIG. 4 is a plan view schematically showing an assembled battery according to an embodiment of the present disclosure.

FIG. 4 is a plan view schematically showing an assembled battery according to the present embodiment. As shown in FIG. 4, an assembled battery 1 according to the present embodiment includes six single cells 10 having the above configuration, and is produced by electrically connecting the positive electrode terminals 12 and the negative electrode terminals 14 of the six single cells 10 by bus bars 40. The configuration of the assembled battery 1 according to the present embodiment will be described below in detail. Note that, in the following description, for convenience of description, a single cell 10A having a positive electrode output terminal 12a which is a positive electrode terminal that is open to the outside will be referred to as the $1^{st}$ single cell 10A and a single cell 10F having a negative electrode output terminal 14a will be referred to as the $6^{th}$ single cell 10F. Therefore, in the electrical connection with the bus bar 40, single cells disposed between the $1^{st}$ single cell 10A and the $6^{th}$ single cell 10F will be referred to as the $2^{nd}$ to $5^{th}$ single cells 10B to 10E, respectively.

As shown in FIG. 4, in the assembled battery 1 according to the present embodiment, two single cell array units A and B are formed by arranging three single cells 10 in an arrangement direction x. The arrangement direction x of the single cells 10 in the single cell array units A and B is the same as a lamination direction y (refer to FIG. 3) of positive and negative electrodes of the electrode body 30. Hereinafter, for convenience of description, the upper single cell array unit A in FIG. 4 will be referred to as a "first row single cell array unit A" and the lower single cell array unit B will be referred to as a "second row single cell array unit B." The first row single cell array unit A is formed when the $2^{nd}$ single cell 10B, the $4^{th}$ single cell 10D, and the $6^{th}$ single cell 10F are arranged adjacent to each other such that wide surfaces (flat surfaces) are opposite to each other. On the other hand, the single cell array unit B is formed when the $1^{st}$ single cell 10A, the $3^{rd}$ single cell 10C, and the $5^{th}$ single cell 10E are arranged adjacent to each other such that wide surfaces are opposite to each other.

Then, the first row single cell array unit A and the second row single cell array unit B are disposed parallel to each other such that the arrangement directions of the single cells 10 constituting the single cell array units are substantially parallel to each other. In the present embodiment, the first row single cell array unit A and the second row single cell array unit B are disposed adjacent to each other such that narrow surfaces of the single cells 10 constituting the first row single cell array unit A and narrow surfaces of the single cells 10 constituting the second row single cell array unit B are opposite to each other. When the single cell array units A and B are disposed in this manner, the first row single cell array unit A and the second row single cell array unit B are disposed substantially parallel to each other, the positive electrode terminal 12 of the single cells 10B, 10D, and 10F constituting the first row single cell array unit A and the negative electrode terminal 14 of the single cells 10A, 10C, and 10E constituting the second row single cell array unit B being close to each other. Note that, in this specification, "substantially parallel" refers to not only a case in which arrangement directions of single cells constituting single cell array units are completely parallel, but also a case in which an arrangement direction of single cells constituting the second row single cell array unit B is inclined by −5° to +50 with respect to an arrangement direction of single cells constituting the first row single cell array unit A.

Then, in the assembled battery 1 according to the present embodiment, none of the single cells 10A to 10F included in the single cell array units A and B is directly electrically connected to adjacent single cells in the same single cell array unit, but is directly electrically connected to any one of the single cells constituting another single cell array unit through the bus bar 40. That is, unlike an assembled battery (refer to FIG. 9) of the related art in which single cells are sequentially electrically connected in the arrangement direction x, in the assembled battery 1 according to the present embodiment, an electrical connection is formed such that the bus bar 40 extends in a direction different from the arrangement direction x of single cells. Specifically, the $1^{st}$ single cell 10A included in the second row single cell array unit B is not directly electrically connected to the adjacent $3^{rd}$ single cell 10C in the same second row single cell array unit B, but is directly electrically connected to the $2^{nd}$ single cell 10B of the first row single cell array unit A which is in another row through the bus bar 40. Furthermore, similarly, the $2^{nd}$ single cell 10B is not directly electrically connected to the adjacent $4^{th}$ single cell 10D in the first row single cell array unit A, but is directly electrically connected to the $3^{rd}$ single cell 10C in the second row single cell array unit B. Although detailed description will be omitted below, in the assembled battery 1 according to the present embodiment, similarly, the $3^{rd}$ to $6^{th}$ single cells 10C to 10F are not directly electrically connected to adjacent single cells in the same single cell array unit, but are directly electrically connected to a single cell included in another single cell array unit.

Figure 5:
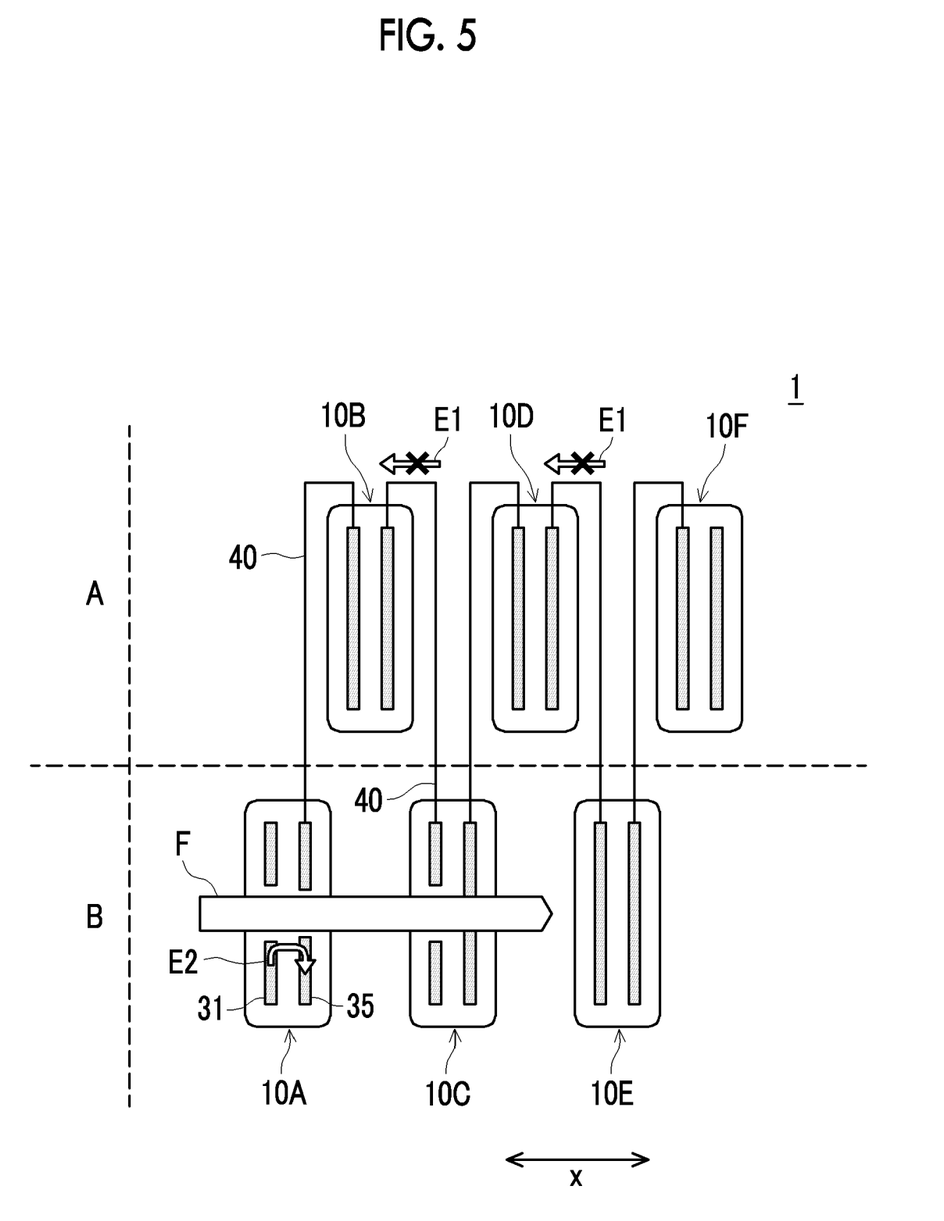
FIG. 5 is an explanatory diagram schematically showing a state in which a conductive foreign body is stuck into an assembled battery according to an embodiment of the present disclosure.

A case in which a conductive foreign body F such as a nail is stuck into the assembled battery 1 having such a configuration according to the present embodiment will be described. FIG. 5 is an explanatory diagram schematically showing a state in which a conductive foreign body F is stuck into an assembled battery according to the present embodiment.

For example, as shown in FIG. 5, when a sharp conductive foreign body F such as a nail is stuck into the assembled battery 1 according to the present embodiment, the conductive foreign body F is stuck into one single cell array unit (the single cell array unit B in FIG. 5) from the two single cell array units A and B disposed substantially parallel to each other, and penetrates through the single cells 10A, 10C, and 10E constituting the single cell array unit B. In this case, in the assembled battery 1 according to the present embodiment, since the single cells 10A, 10C, and 10E constituting the second row single cell array unit B are not directly connected to each other through the bus bar 40, even if the conductive foreign body F penetrates through the single cells 10A, 10C, and 10E constituting the second row single cell array unit B, no conductive path is formed through the bus bar 40 and the conductive foreign body F. Therefore, according to the assembled battery 1 in the present embodiment, even if the conductive foreign body F is stuck in, a short circuit current E1 of external short circuiting through the bus bar 40 is not generated, and only a short circuit current E2 of internal short circuiting is generated in the single cells 10A, 10C, and 10E. Therefore, a rapid temperature rise due to the short circuit current E1 of external short circuiting does not occur, and a temperature rise of each single cell can be substantially the same as a temperature rise occurring when a conductive foreign body is stuck into a single secondary battery.

Here, while a case in which the conductive foreign body F is stuck into the second row single cell array unit B has been exemplified in the above description, similarly, in the first row single cell array unit A, the single cells 10B, 10D, and 10F constituting the single cell array unit A are not directly connected to each other through the bus bar 40. Therefore, even if the conductive foreign body F is stuck into the first row single cell array unit A, no external short circuiting is formed through the bus bar 40 and a rapid temperature rise can be prevented.

In addition, when the assembled battery 1 according to the present embodiment is mounted in a moving body such as a vehicle, an orientation of the assembled battery 1 is preferably adjusted such that the arrangement direction x of single cells constituting the single cell array units A and B and a travelling direction of a moving body such as a vehicle are the same direction. Accordingly, when the assembled battery 1 is stuck into the conductive foreign body F, since the conductive foreign body F readily sticks into only one single cell array unit from the two single cell array units A and B disposed substantially parallel to each other, it is possible for the above effects to be more suitably exhibited.

Figure 6:
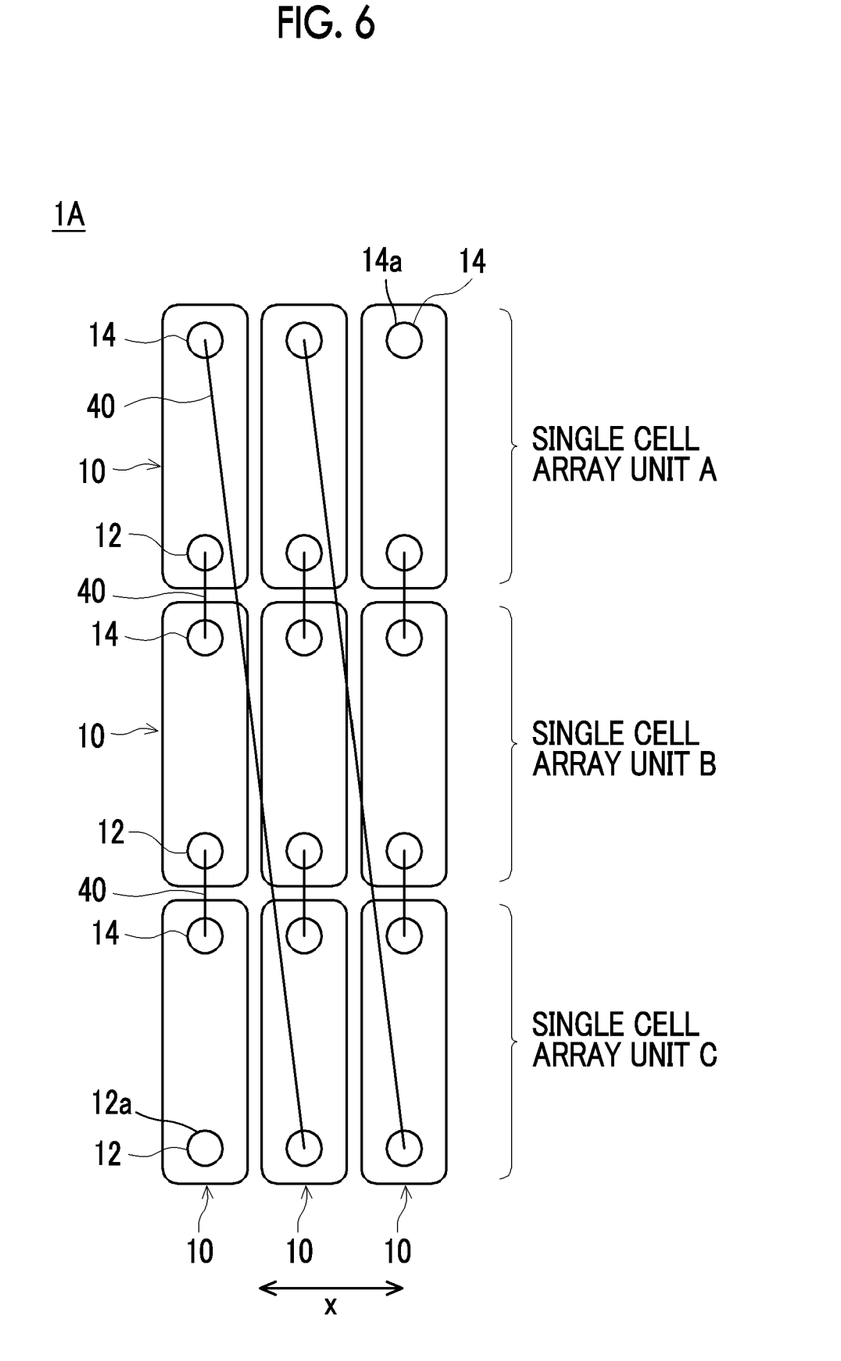
FIG. 6 is a plan view schematically showing an assembled battery according to another embodiment of the present disclosure.

Here, while the assembled battery 1 including two single cell array units A and B composed of three assembled batteries has been exemplified in the above embodiment, the number of single cell array units and the number of single cells constituting the single cell array unit are not particularly limited. For example, as shown in FIG. 6, also in an assembled battery 1A in which the three single cell array units A, B, and C including three single cells 10 are arranged parallel to each other, when single cells constituting the same single cell array unit are not directly electrically connected to each other, and single cells constituting another single cell array unit are respectively directly electrically connected thereto through the bus bars 40, the occurrence of external short circuiting through the bus bar 40 can be prevented.

Test Examples

Test examples related to the present disclosure will be described below, but the following test examples are not intended to limit the present disclosure.

1. Production of Assembled Batteries of Test Examples (1) Test Example 1

A rectangular positive electrode in which a positive electrode active material layer in which a positive electrode active material ($LiNi_{1/3}Co_{1/3}Mn_{1/3}O_2$), a conductive material (acetylene black), and a binder (PVDF) were mixed together in proportions of a mass ratio of 94:3:3 was formed on both surfaces of a positive electrode current collector (an aluminum foil) with a thickness of 12 μm was produced. On the other hand, a rectangular negative electrode in which a negative electrode active material layer in which a negative electrode active material (graphite), a thickener (CMC), and a binder (SBR) were mixed together in proportions of a mass ratio of 98:1:1 was formed on both surfaces of a negative electrode current collector (a copper foil) with a thickness of 10 μm was produced. Then, each of the above positive electrodes and negative electrodes were laminated with separators therebetween to produce a laminated electrode body. The laminated electrode body was accommodated in a rectangular battery case shown in FIG. 1 (width W=148 mm, thickness D=26.4 mm, height H=91 mm) together with an electrolyte solution to produce a single cell having a capacity of 35 Ah.

Then, in Test Example 1, six single cells 10 were produced. As shown in FIG. 4, two single cell array units A and B in which three single cells were arranged in the arrangement direction x were formed. Then, the single cell array units A and B were disposed parallel to each other such that an arrangement direction of the single cells 10B, 10D, and 10F constituting the first row single cell array unit A and an arrangement direction of the single cells 10A, 10C, and 10E constituting the second row single cell array unit B were substantially parallel to each other, and the disposed single cells 10A to 10F were restricted to a predetermined confining pressure. Then, an electrical connection with the bus bars 40 was formed such that the single cells 10 constituting the single cell array units A and B were not connected to adjacent single cells in the same single cell array unit, but were connected to single cells constituting a single cell array unit of another row.

(2) Test Example 2

In Test Example 2, nine single cells 10 were produced according to the same procedures as in Test Example 1 described above. Then, as shown in FIG. 6, three single cell array units A, B, and C in which three single cells 10 were arranged in the arrangement direction x were formed and the three single cell array units A, B, and C were disposed parallel to each other. Then, in the same manner as in Test Example 1, the single cells 10 were not electrically connected to adjacent single cells in the same single cell array unit, but were electrically connected to single cells constituting a single cell array unit of another row.

(3) Test Example 3

Figure 7:
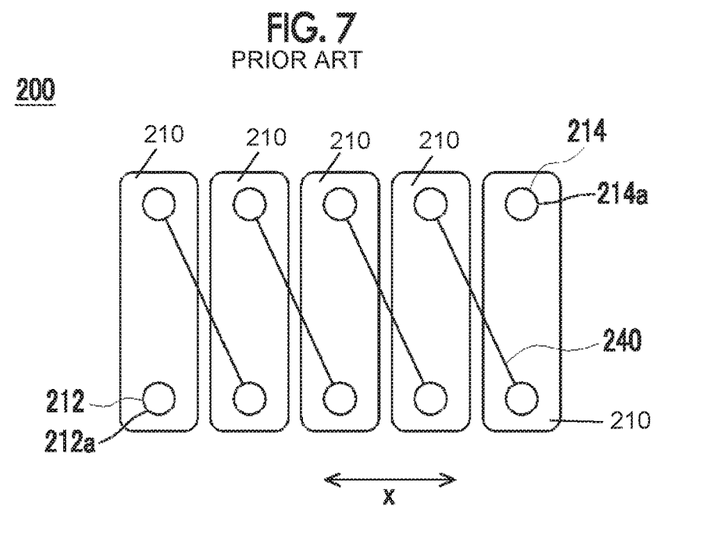
FIG. 7 is a plan view schematically showing an assembled battery of Test Example 3.

In Test Example 3, five single cells 210 were produced according to the same procedures as in Test Example 1. Then, as shown in FIG. 7, the five single cells 210 were arranged in a lamination direction (that is, the arrangement direction x) of an electrode body (not shown). Then, an assembled battery 200 was produced by connecting positive electrode terminals 212 and negative electrode terminals 214 between adjacent single cells 210 through bus bars 240. Here, in the assembled battery 200 shown in FIG. 7, a single cell 210 including a positive electrode output terminal 212a was disposed at one end in the arrangement direction x and a single cell 210 including a negative electrode output terminal 214a was disposed at the other end.

(4) Test Example 4

Figure 8:
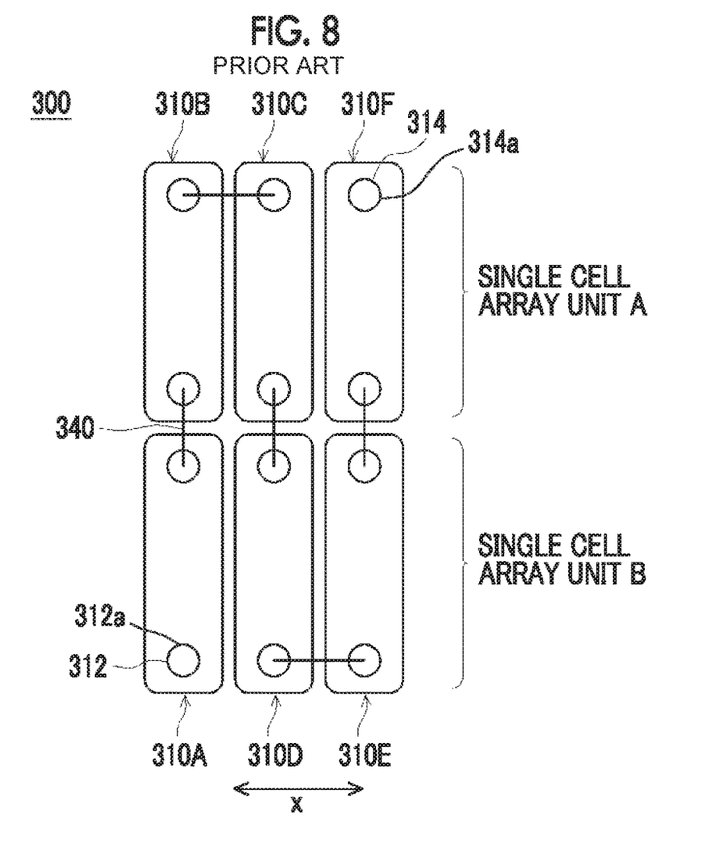
FIG. 8 is a plan view schematically showing an assembled battery of Test Example 4.

As shown in FIG. 8, in Test Example 4, in the same manner as in Test Example 1 described above, six single cells 310A to 310F were produced, three single cells 310 were arranged in the arrangement direction x to form two single cell array units A and B, and the formed single cell array units A and B were disposed parallel to each other so that they were substantially parallel to each other. Then, in Test Example 4, positive electrode terminals 312 and negative electrode terminals 314 between the single cells 310A to 310F were connected through bus bars 340 such that adjacent single cells were sequentially connected to each other from the 1$^{st}$ single cell 310A including a positive electrode output terminal 312a to the 6$^{h}$ single cell 310F including a negative electrode output terminal 314a. Specifically, an assembled battery 300 of Test Example 4 was different from the assembled battery of Test Example 1 in that an electrical connection between the 2$^{nd}$ single cell 310B and the 3$^{rd}$ single cell 310C and an electrical connection between the 4$^{th}$ single cell 310D and the 5$^{th}$ single cell 310E were connections between adjacent single cells in the same single cell array unit.

2. Evaluation Test

As an evaluation test for evaluating the assembled batteries produced in Test Example 1 to Test Example 4, the following nail penetration test was performed. In the nail penetration test, first, under a temperature environment at 25° C., the assembled batteries of Test Example 1 to Test Example 4 were adjusted to a charged state of SOC 100%. Next, two thermocouples were attached to the outer surface of a battery case, and a tungsten nail was stuck into single cells in the arrangement direction x. Here, the diameter of the nail was 6 mm, and the angle of the tip was 60°. The nail was stuck in at a right angle in the vicinity of the center of the wide surface of a rectangular battery case at a speed of 25 mm/sec. Here, in Test Examples 1, 2, and 4, the nail was stuck in to penetrate through single cells constituting the single cell array unit A among a plurality of single cell array units. In Test Example 3, the nail was stuck into and penetrated through all single cells.

(1) Measurement of Short Circuit Current

While the above nail penetration test was performed on the assembled batteries of Test Example 1 to Test Example 4, a current flowing through a bus bar electrically connecting the single cells was measured as a short circuit current of external short circuiting. Table 1 shows maximum values of the short circuit currents of external short circuiting measured in the test examples.

(2) Measurement of Maximum Temperature

While the above nail penetration test was performed on the assembled batteries of Test Example 1 to Test Example 4, the temperatures of the single cells constituting the assembled batteries were measured. Among the measured temperatures, the highest temperature is shown in Table 1 as the maximum temperature of a single cell.

TABLE 1

|  | Maximum value (A) of short circuit current | Maximum temperature (° C.) of single cell |
| --- | --- | --- |
| Test Example 1 | 0 | 400 |
| Test Example 2 | 0 | 400 |
| Test Example 3 | 700 | 620 |
| Test Example 4 | 700 | 620 |

3. Evaluation Results

In the results shown in Table 1, in Test Example 1 and Test Example 2, no short circuit current of external short circuiting through a bus bar was generated and the maximum temperature of a single cell was lower than that of Test Examples 3 and 4. Therefore, it was confirmed that, as in Test Example 1 and Test Example 2, when an assembled battery in which single cell array units are disposed parallel to each other is produced, and adjacent single cells are not directly connected to each other in the same single cell array unit, but single cells constituting another single cell array unit are respectively directly connected thereto through bus bars, it is possible to prevent the occurrence of external short circuiting when a conductive foreign body is stuck into the assembled battery and prevent a rapid temperature rise due to a short circuit current.

While specific examples of the present disclosure have been described above in detail, these are only examples, and do not limit the scope of the claims. Technologies described in the scope of claims include various modifications and alternations of the specific examples exemplified above.

What is claimed is:
1. An assembled battery including:
    a plurality of cell arrays,
    each of the plurality of cell arrays including a plurality of single cells,
    each of the plurality of single cells having a rectangular shaped battery case accommodating an electrode body, a positive terminal, and a negative terminal, the electrode body having a sheet-shaped positive electrode and a sheet-shaped negative electrode that are stacked in a lamination direction, and the positive terminal and the negative terminal being aligned with each other in an alignment direction perpendicular to the lamination direction,
    where each of the plurality of cell arrays includes a plurality of the single cells stacked adjacent to each other along the lamination direction of the single cells, wherein a first cell array is arranged adjacent to a second cell array such that the lamination direction of the first cell array is parallel to the lamination direction of the second cell array, and the alignment direction of the positive terminal and the negative terminal of each single cell in the first cell array is aligned with the alignment direction of the positive terminal and the negative terminal of a corresponding single cell in the second cell array such that the positive terminal of each single cell in the first cell array faces the negative terminal of the corresponding single cell constituting the second cell array along the alignment direction, wherein none of the single cells is directly electrically connected to another single cell in the same cell array, and the positive terminal of each of the single cells constituting the first cell array is directly electrically connected through a bus bar to the negative terminal of the corresponding single cell constituting the second cell array along the alignment direction, and the negative terminal of each of the single cells constituting the first cell array is directly electrically connected through a bus bar to the positive terminal of a single cell that is different from the corresponding single cell constituting the second cell array in the alignment direction, and wherein the parallel lamination directions of the cell arrays and a travelling direction of a vehicle in which the assembled battery is mounted are in the same direction.

2. The assembled battery according to claim 1, wherein, in the assembled battery, an electrical connection is formed such that each of the bus bars extends in a direction different from the lamination direction of the cell arrays.

* * * * *